Jan. 22, 1957 G. H. EASH 2,778,635

STATIC ELIMINATOR FOR ENDLESS MAGNETIC TAPE CARTRIDGES

Filed Aug. 24, 1954

INVENTOR.
GEORGE H. EASH

BY Malcolm W. Fraser
ATTORNEY

United States Patent Office 2,778,635

Patented Jan. 22, 1957

2,778,635

STATIC ELIMINATOR FOR ENDLESS MAGNETIC TAPE CARTRIDGES

George H. Eash, Toledo, Ohio, assignor to George H. Poulsen, Toledo, Ohio; The Toledo Trust Company and Charles I. Poulsen, executors of the estate of said George H. Poulsen, deceased Application August 24, 1954, Serial No. 451,931

4 Claims. (Cl. 271—2.18)

This invention relates to magnetic tape cartridges of the type employing an endless coil of tape and having an exposed loop for coation with a recording or reproducing instrumentality.

An object is to produce new and improved means for eliminating or neutralizing static caused by the rubbing of adjacent convolutions of the coil one upon another during the continuous takeoff and rewind.

Another object is to produce a static eliminator or neutralizer which resiliently contacts the edges of the tape coil as the latter rotates.

A still further object is to apply to opposite edge portions of the tape coil graphite means extending across and in contact with the respective faces of the roll for removing static therefrom.

A further object is to produce auxiliary means for static elimination or neutralization in an endless tape coil which cooperates with graphite means carried by the tape reel and engages the edge of the coil opposite to that engaged by the graphite means, thereby to free the tape for unimpeded movements.

A still further object is to produce tape coil engaging means, which not only eliminates static caused from relative movement of the tape convolutions for example, but also militates against the disarrangement of the coil convolutions from axial creeping thereof during the continuous takeoff and rewind.

A still further object is to space the lower or outer edge of the tape from the bottom wall of the casing as it passes to the coil to prevent fouling and assist in the free running of the tape.

Other objects and advantages of the invention will hereinafter appear and for purposes of illustration but not of limitation, an embodiment of the invention is shown on the accompanying drawings in which Figure 1 is a top plan view of a cartridge or magazine having an endless magnetic recording-reproducing tape mounted therein, a portion of the cover being broken away for purposes of clarity;

Figure 1:
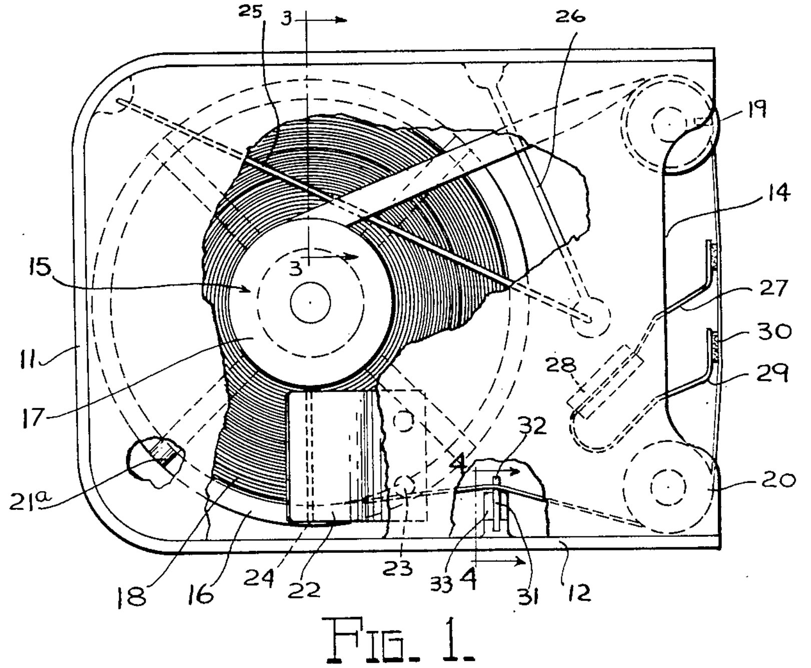
Figure 2:
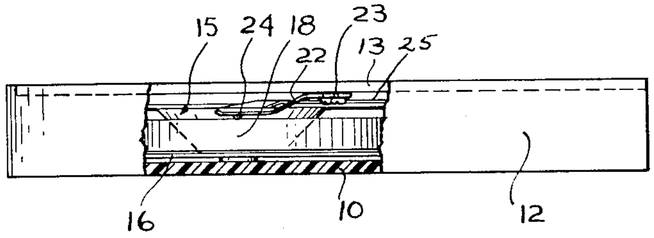
Figure 2 is a side edge elevation with a portion of the side wall broken away to show the inside of the cartridge.
Figure 3:
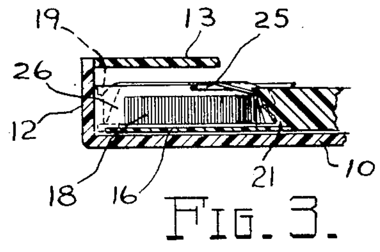
Figure 3 is a transverse sectional view substantially on the line 3—3 of Figure 1.

The illustrated embodiment of the invention comprises a cartridge or magazine housing having a bottom wall 10, an upright end wall 11 and side walls 12 integral with the bottom and end walls. A flat cover 13 may have a pressed fit to engage the end and side walls and as shown, the front end of the cartridge is open. The top and bottom walls have registering cut-outs 14 in order to expose a portion of the magnetic tape for operative engagement with a driving roll and transducer head carried by a suitable recording or reproducing instrumentality (not shown). It will be understood that the cartridge thus formed is relatively thin and has flat top and bottom walls, as well as flat side and end walls, which are adapted to slide through suitable channels (not shown) on the recording or reproducing instrumentality.

Occupying the rearward portion of the cartridge is a reel 15 having a round bottom plate 16 and a hub 17 about which is spirally wound the endless tape 18. Integral with the housing wall 10 and rising vertically therefrom is a suitable post (not shown) upon which the reel is journaled with its bottom plate 16 contiguous to the bottom wall 10 of the housing and its hub 17 facing the cover 13. The side wall of the hub 21 is conical and flares upwardly and outwardly at an angle of about 50° with respect to the bottom plate 16, so as to enable the innermost convolution of the coil of tape to be brought out to the top face of the coil. From the innermost convolution the tape passes upwardly and forwardly across the top face of the roll and outwardly over a flanged guide cylinder 19 mounted on the bottom wall 10. Thence, the tape extends transversely across the open end of the cartridge and about a roller 20 from which it passes to and becomes the outermost convolution of the coil. The loop of tape thus formed is exposed at the open front of the cartridge housing to be progressed past the transducer head of the recording or reproducing instrumentality as the tape is advanced by virtue of its being gripped between the roller 20 and a suitable drive wheel (not shown). Thus it will be manifest that the tape passes from the inside of the spiral coil to the outside thereof.

The relative movement between the tape convolutions of the spiral coil during operation generates static electricity, which, if not eliminated or neutralized, interferes with the free and unimpeded rotation of the coil and the smooth and uniform movement of its exposed loop from and back to the coil. For this purpose graphite strips or rods 21a are arranged radially of the reel plate 16 and, as shown, four of these strips or rods are arranged equidistantly on the plate 16 so as to have direct contact with the adjacent edge of all convolutions of the coil. These graphite strips or rods may be secured in place in any suitable manner and extend a very slight distance above the normal plane of the flat plate 16. Not only do these graphite strips eliminate or neutralize static, but also they space the adjacent face of the spiral coil from the plate 16 and thereby lubricate and reduce the frictional engagement of the coil with the reel plate 16. Instead of such graphite strips or rods, if desired thin metallic wires coated with graphite may be employed and although the static eliminating or neutralizing elements 21a perform best if they are made of pure graphite, fairly satisfactory results are obtainable if these elements are made of graphite-bearing material, as for instance, bronze which is heavily loaded with graphite and is often used for oilless bearings.

Carried by the cover 13 is a plate 22 of spring metal, which is secured in place by screws 23. The plate inclines downwardly toward the adjacent face of the tape coil and terminates in a flat portion parallel and in close relation to the face of the coil. Secured to the under face of the parallel portion of the spring plate is a strip or rod of graphite 24, which is lightly and resiliently pressed against the coil face by the plate so that as the coil rotates, substantially all edges of the tape convolutions engage the graphite strip thereby eliminating or neutralizing static in the coil and cooperating with the graphite strips 21a for this purpose. In some instances the graphite strips 21a may be eliminated in favor of the strip 24 but in such event the strips 21a should be replaced by steel rods, embossures or the like to reduce as much as possible the frictional contact between the face of the tape coil and the reel plate 16.

The spring pressed graphite rod or strip 24 has the additional function of preventing excessive axial creeping in an upward direction of the tape convolutions. Any tendency of the convolutions to creep in this manner is prevented by the strip 24 against which the convolutions engage and which gently presses the same back into position as the coil rotates. It is found that by starting any convolution which has moved axially from the face of the coil, in the opposite direction or toward the reel plate 16, it will continue to move until it has returned to its proper position.

Near the edge of the reel plate 16 is a flat bar 26 disposed with its length transversely to the travel of the tape and its width vertical with the lower edge resting on the bottom wall and the upper providing an additional guide for the tape in its travel to the flanged guide 19. However, before reaching the bar 26 the tape passes over a guidewire 25. This wire has downturned ends fitting sockets formed in posts on the bottom plate 10. As shown the wire 27 is arranged slightly above the top face of the coil and is arranged close to the hub 15 of the reel so that as the tape passes from the center of the coil it engages over the wire guide and thence travels flatly in a position substantially parallel to the top and bottom walls of the housing to the guide bar 26. The position of the guide wire 25 is important and should be properly spaced both vertically and horizontally. The farther the wire 25 extends from the hub 17 of the reel the higher it should be placed. In other words, the tape, as it passes from the inside of the coil inclines upwardly at an angle of the order of the hub of the reel and to afford free and unimpeded movement of the tape and fully to engage the guide wire 25 throughout its transverse dimension, the vertical and horizontal spacing must be observed. Thus by placing the wire close to the hub, it should be arranged in close juxtaposition to the adjacent face of the coil but if it is moved farther away from the hub, then it will have to be raised in order to observe the proper angle of the tape as it leaves the coil.

As shown, a U-shaped spring 27 is fixed intermediate its ends to a bracket 28 on the bottom wall of the housing and the free ends of the spring are inclined as indicated at 29 and have felt pads for pressing the tape resiliently against the usual transducer and erasure heads respectively, as will be readily understood by those skilled in this art.

Figure 4:
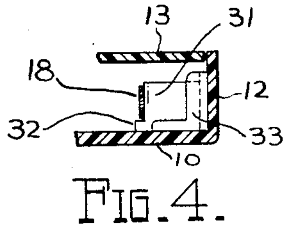
Figure 4 is a transverse sectional view substantially on the line 4—4 of Figure 1.

Between the roller 20 and the reel is disposed a block 31 which as best shown on Figure 4, has a bottom forwardly extending ledge 32. The block is engaged by a suitable holder 33 which retains it in a stationary position. The block 31 may be of graphite or any other suitable material. As the tape wipes over the vertical portion of the block, if it is of graphite, it will pick up some graphite and assist in the lubrication of the adjacent convolutions of the coil. The block projects inwardly from the housing wall towards the outside of the roll to exert a guiding influence on the tape. The purpose of the ledge 32 is to space the lower edge of the tape from the bottom wall 10 a distance substantially equal to the spacing of the lower edge of the coil from the bottom wall, thereby eliminating any tendency of the tape to foul during its travel to the tape coil. Thus the height of the ledge 32 is approximately equal to the height of the lower base of the coil from the bottom wall of the housing. This contributes to the free and unimpeded movement of the endless tape as it is rewound upon the coil.

The elimination or neutralization of static electricity between the tape convolutions is very important in connection with a relatively large coil having several hundred feet of tape thereon. The relative movement between adjacent convolutions creates such static as to impede and sometimes entirely prevent rotation of the reel and the free continuous takeoff and rewind of the tape. It is believed that the static charges vary in intensity in different sections of the coil but by employing the graphite strips as above described, the static is dissipated, or undesired accumulation of static charges in different zones of the coil is prevented. In other words the static within the coil to a large extent may be equalized and the charges between convolutions kept so small as not to interfere with each other during the rotation of the coil. Manifestly the use of graphite in this connection has the dual function of eliminating or neutralizing the static and also the source of lubrication to assure smooth operation.

It is to be understood that numerous changes in details of construction, arrangement, operation and choice of materials may be effected without departing from the spirit of the invention especially as defined in the appended claims.

What I claim is:

1. A magnetic cartridge comprising a coil of magnetic tape in a housing, the housing having substantially flat walls overlying the opposite faces of the coil, means rotatably mounting the coil in the housing with a loop of the tape exposed outside the housing for coaction with recording or reproducing instrumentalities, means for removing static from the coil, said means comprising a rod formed essentially of graphite and extending across the face of the coil in contact with the adjacent edge of the convolutions, and a spring device carried by the adjacent flat housing wall and pressing against said rod for resiliently urging same into contact with the edges of the convolutions.

2. A magnetic tape cartridge comprising a coil of magnetic tape in a housing, the housing having substantially flat walls overlying the opposite faces of the coil, means rotatably mounting the coil in the housing with a loop of the tape exposed outside the housing for coaction with recording or reproducing instrumentalities, said means comprising a reel upon which the coil is wound, the reel being journaled in the housing to turn about an axis perpendicular to its side walls, means for removing static from the coil comprising graphite rods carried by the reel and substantially radiating from its axis, said rods having intimate contact with the adjacent face of the coil, and a spring-tensioned graphite rod extending across the opposite face of the coil and in engagement therewith.

3. A magnetic cartridge comprising a coil of magnetic tape in a housing, the housing having substantially flat walls overlying the opposite faces of the coil, a reel rotatably mounting the coil in the housing with a loop of the tape exposed outside the housing for coaction with recording or reproducing instrumentalities, means for removing static from the coil, and guide means in the housing for guiding the movement of the tape, said guide means including a graphite member over which the tape wipes as it passes to the coil, and a ledge on the base portion of the graphite member for spacing the lower edge of the tape from the adjacent housing wall, the top of said ledge being spaced from the housing wall a distance sufficient to guide the tape to the coil on the reel.

4. A magnetic cartridge comprising a coil of magnetic tape in a housing, the housing having substantially flat walls overlying the opposite faces of the coil, means rotatably mounting the coil in the housing with a loop of the tape exposed outside the housing for coaction with recording or reproducing instrumentalities, means for removing static from the coil, and guide means in the housing for guiding the movement of the tape, said guide means including a post over which the tape wipes as it passes to the coil, a mounting for said post spacing same inwardly from the adjacent side of the housing toward the tape a distance slightly in excess of the distance between the periphery of the coil and the respective side of the housing.

References Cited in the file of this patent

UNITED STATES PATENTS

| | | |
|---|---|---|
| 2,175,538 | Morsbach et al. | Oct. 10, 1939 |
| 2,286,200 | Dollnig | June 16, 1942 |
| 2,426,838 | Miller | Sept. 2, 1947 |
| 2,490,771 | Begun | Dec. 13, 1949 |
| 2,658,955 | Carson | Nov. 10, 1953 |